Nov. 18, 1941.  F. M. MARTIN  2,263,183
AUXILIARY PRESSURE MEANS FOR EXTRUSION DEVICES
Filed May 24, 1938
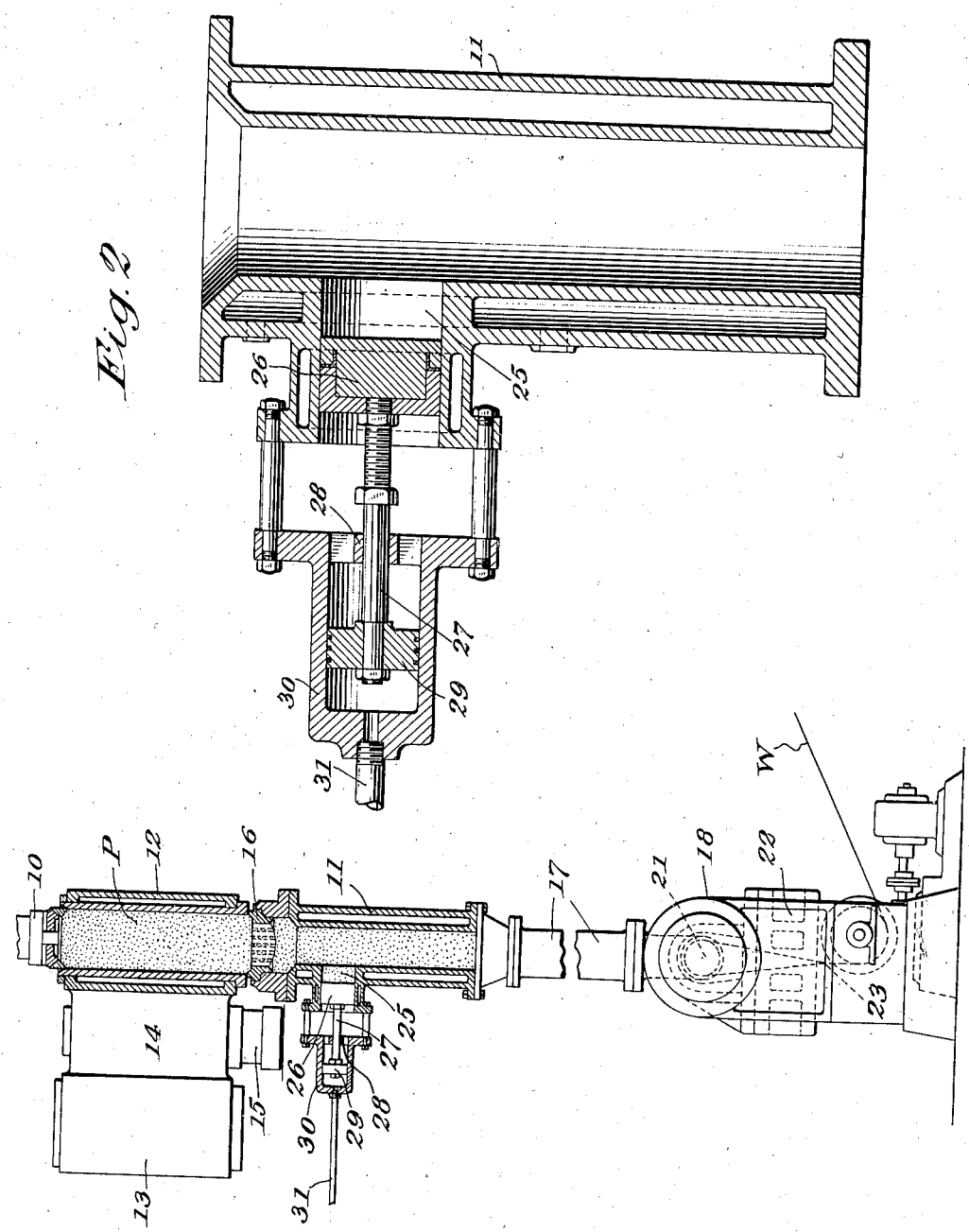

Patented Nov. 18, 1941

2,263,183

UNITED STATES PATENT OFFICE 2,263,183

AUXILIARY PRESSURE MEANS FOR EXTRUSION DEVICES

Frank M. Martin, Springfield, Mass., assignor to Monsanto Chemical Company, St. Louis, Mo., a corporation of Delaware Application May 24, 1938, Serial No. 209,684

2 Claims. (Cl. 18—12)

The present invention relates to apparatus for forming by extrusion continuous lengths from plastic material, for instance, plasticized cellulose nitrate, cellulose acetate, polyvinyl acetal resins and the like, these materials being highly viscous and requiring considerable pressures to force them through the extrusion dies. While the invention is intended particularly for use in the manufacture of continuous webs of interleaf material for use in laminated glass and for similar purposes, it is also applicable to the manufacture of tubes, rods and the like, particularly where close adherence to dimensions is necessary.

Interleaf material for laminated glass must be of extremely uniform gauge. Otherwise, difficulties during lamination result and the optical properties of the final product are unsatisfactory. For instance, with a plasticized cellulose acetate plastic, it is necessary to maintain the gauge so that the variation in thickness shall not exceed 0.001" in any inch of length or breadth.

Heretofore it has been common practice to force the plasticized stock through the extrusion die by means of a stuffing press having a spiral worm or impeller and to feed the stuffing press itself through a conduit connected to a loading cylinder in which operates a hydraulic ram. The pressure in the conduit leading to the stuffing press is maximum when the piston of the ram is moving downward and drops to zero when the piston is withdrawn to permit reloading the cylinders. Notwithstanding the fact that the spiral worm is continuous in operation and in spite of the interposition of certain other mechanisms between the ram and the stuffing press, it is found that variations in pressure corresponding to the variations in pressure produced by the ram are transmitted to the extrusion die and produce seriously objectionable variations in gauge of the finished stock.

My invention, therefore, has for its object a mechanism which will overcome these variations in pressure in a simple and effective way. Accordingly, I interpose between the loading cylinder and the stuffing press a chamber adapted to receive surplus plastic material from the conduit and restore the same under pressure to the conduit when the pressure in the conduit tends to fall below a predetermined amount. In practice, I employ an auxiliary cylinder connected to the conduit, said cylinder containing a piston, which is itself operated by a piston and cylinder, to which fluid under pressure can be admitted at the proper time. For convenience, I call the device auxiliary pressure means. The auxiliary pressure means receive plastic material under pressure from the conduit when the plastic material is being forced by the hydraulic ram from the loading cylinder through the main conduit to the extrusion die and during the interval for reloading the loading cylinder, the auxiliary pressure means in turn supplies plastic material to the main conduit at substantially the same rate and pressure as it is received from the loading cylinder. As a result, the fluctuations of pressure in the conduit are reduced to a minimum.

In the drawing I have shown the necessary portion of apparatus suitable for the manufacture of interleaf material for laminated glass.

The invention will be more clearly understood from the following description in conjunction with the accompanying drawing: in which Fig. 1 is an elevational view, partly in section, of an apparatus embodying the invention, and Fig. 2 is a sectional elevational view of a portion of the apparatus shown in Fig. 1.

The embodiment of the invention illustrated in the accompanying drawing comprises loading cylinders 12 and 13 formed upon the opposite ends of an arm 14 which is pivotally mounted upon a stationary shaft 15 so that the loading cylinders may be alternately moved into a position in communication with a main cylinder 11a forming part of a conduit 11. An hydraulic ram 10 is arranged for movement into a loading cylinder 12 when the latter is in communication with the main cylinder 11a. A perforated metal screen 16 is mounted upon the outer or upper end of the main cylinder 11a. The conduit 11 communicates with the extrusion die 22, there being interposed in the conduit between ram 10 and the extrusion die 22, if required, suitable apparatus such, for instance, as a stuffing press 18 of the well known type. The conduit 17 communicates with the supply chamber 21 of the stuffing press 18 which itself supplies the extrusion die 22 having an orifice 23. In the drawing, I have shown the conduit 17 as broken to indicate that other apparatus to assist in forcing the stock through the die and not necessary to be described here, may be inserted in the conduit leading to the extrusion die. The main conduit 11 is connected directly with an auxiliary chamber 25. This chamber contains a piston 26 mounted on piston rod 27 which is slidably guided in a bearing 28 and connects the plunger 26 with a piston 29 movable in a cylinder 30 which is supplied with fluid under pressure through a conduit 31.

In the operation of the machine the loading cylinder 12 is filled with plastic material P, such as plasticized polyvinyl acetal resin, and is moved into the position shown in Fig. 1. The hydraulic plunger 10 is then moved downwardly at a predetermined rate and exerts such a pressure upon the plastic material as to force the material through the screen 16 into the conduit 11 and maintain the plastic material in the conduit 11, preferably, at the required pressure. The plastic material at this pressure passes through the conduit 17, and thence eventually to the stuffing press 18 and the extrusion die 22. The plastic material thus is forced through the slot orifice 23 in the form of a web W.

As the plastic material is forced from the loading cylinder 12 into the conduit 11 surplus plastic material is forced from the conduit 11 into the chamber 25 the plunger 26 being forced outwardly. When the hydraulic ram 10 has reached the bottom of its stroke and emptied the loading cylinder 12 into the conduit 11, the hydraulic ram is raised out of the loading cylinder 12 and the loading cylinder 13, which, in the meantime has been filled with plastic material, is moved into the position occupied by the loading cylinder 12 in Fig. 1. During this interval of reloading, the pressure exerted by the piston 26 on the plastic material in the chamber 25, forced the material back into the conduit 11 thus maintaining a supply for the stuffing press 18 at a pressure which is sufficiently uniform to prevent objectionable variations in pressure being transmitted to the material as it passes through the extrusion die 23. The screen 16 which is ordinarily supplied with textile filter sheets prevents the stock flowing backward into the main cylinder 12 when the auxiliary pressure device is supplying stock to the conduit. The screen and filter sheets are ordinarily effective for this purpose but I do not limit myself to the use of this particular mechanism to prevent back flow of the stock.

I claim:

1. In an apparatus for forming a continuous length of plastic material, in combination, an extrusion die, continuously operating means to force the material through the die, a conduit for conducting plastic material to said means, intermittently operating means for supplying plastic material under pressure to said conduit, means for preventing flow of plastic material from said conduit to said supplying means, and an independently acting auxiliary means associated only with said conduit at a point between said means for supplying plastic material and said continuously operating means for receiving plastic material from the conduit when said material is being supplied to said conduit by said intermittently operating means and to restore said plastic material under pressure to said conduit in the intervals between the operations of said intermittently operating means.

2. In an apparatus for forming a continuous length of plastic material, in combination, an extrusion die, continuously operating means to force the material through the die, a conduit for conducting plastic material to said means, intermittently operating means for supplying plastic material under pressure to said conduit, means for preventing flow of plastic material from said conduit to said supplying means, and an independently acting auxiliary means associated only with said conduit at a point between said means for supplying plastic material and said continuously operating means for receiving plastic material from the conduit when said material is being supplied to said conduit by said intermittently operating means and to restore said plastic material under pressure to said conduit in the intervals between the operations of said intermittently operating means, said independently acting auxiliary means comprising a chamber, a plunger movable in said chamber, means for applying a predetermined force for moving said plunger toward said conduit, but permitting the plunger to move in the opposite direction whereby said plastic mass will flow from said conduit into said chamber when the pressure in said conduit exceeds said force and will return to said conduit when said pressure falls below said force.

FRANK M. MARTIN.